A. B. CRAWFORD.
Clover Huller.

No. 11,990.

2 Sheets—Sheet 1.

Patented Nov. 28, 1854.

A. B. CRAWFORD.
Clover Huller.
No. 11,990.
2 Sheets—Sheet 2.
Patented Nov. 28, 1854.
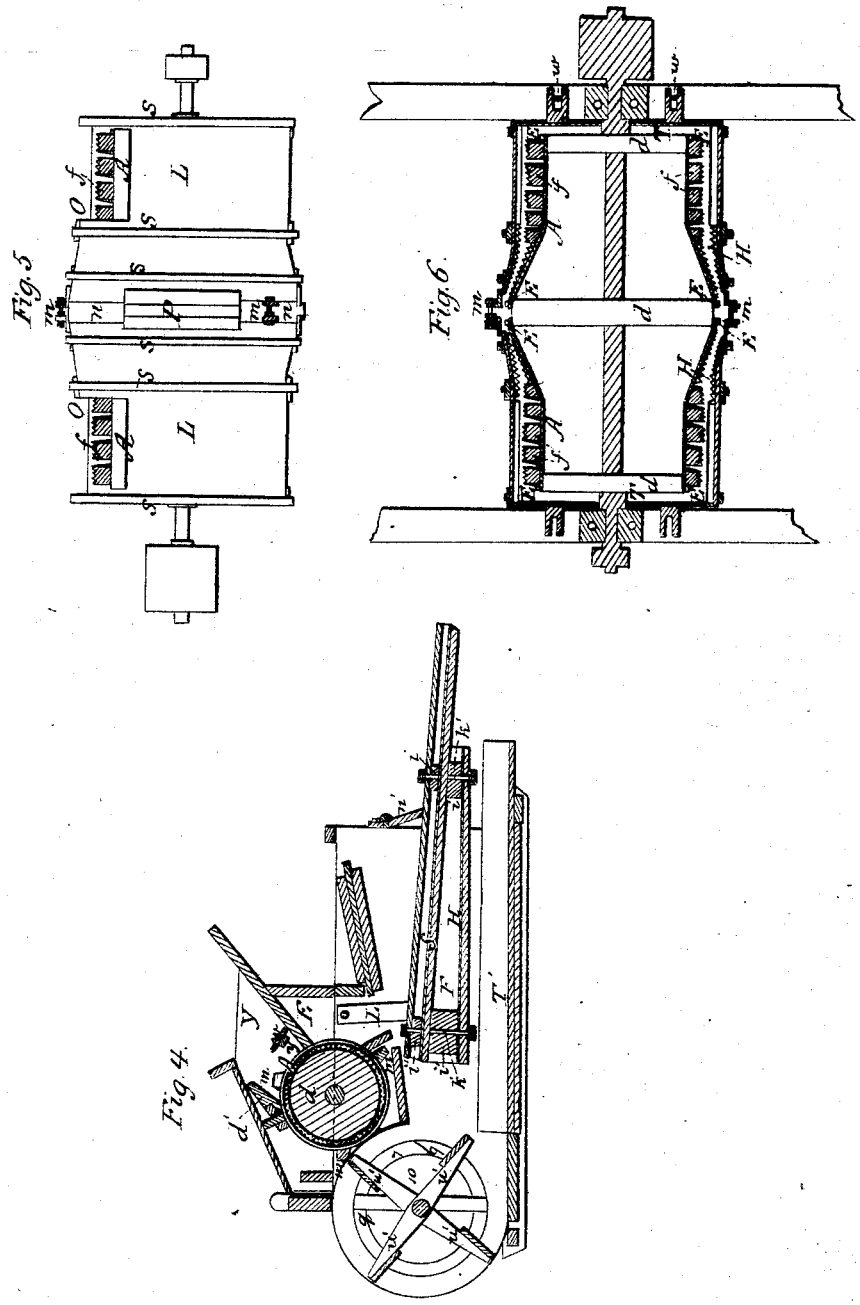

UNITED STATES PATENT OFFICE.

A. B. CRAWFORD, OF WOOSTER, OHIO.

CLOVER-HULLER.

Specification of Letters Patent No. 11,990, dated November 28, 1854.

*To all whom it may concern:*

Be it known that I, A. B. CRAWFORD, of Wooster, in the county of Wayne and State of Ohio, have invented new and useful Improvements on Machines for Hulling and Cleaning Clover-Seed, Rice, &c.; and I do hereby declare that the following is a full, clear, and exact description of the construction and operation of the same, reference being had to the annexed drawings, making a part of the specification, in which—

Figure 3:
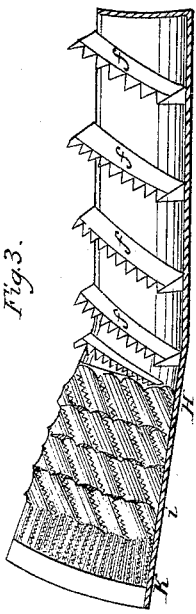
Figure 2:
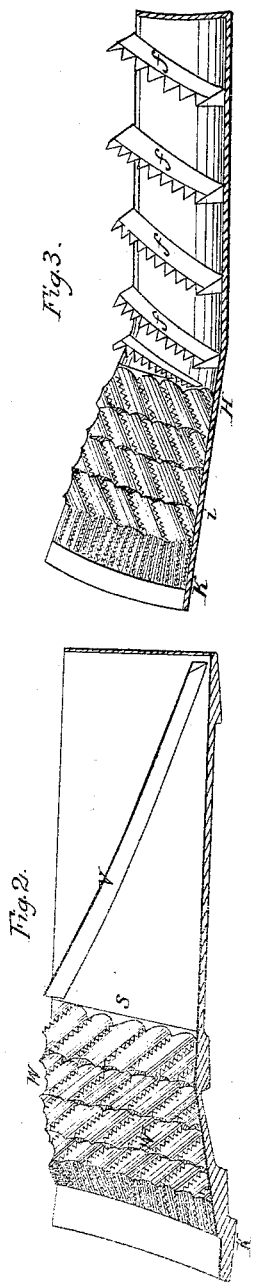
Figure 1:
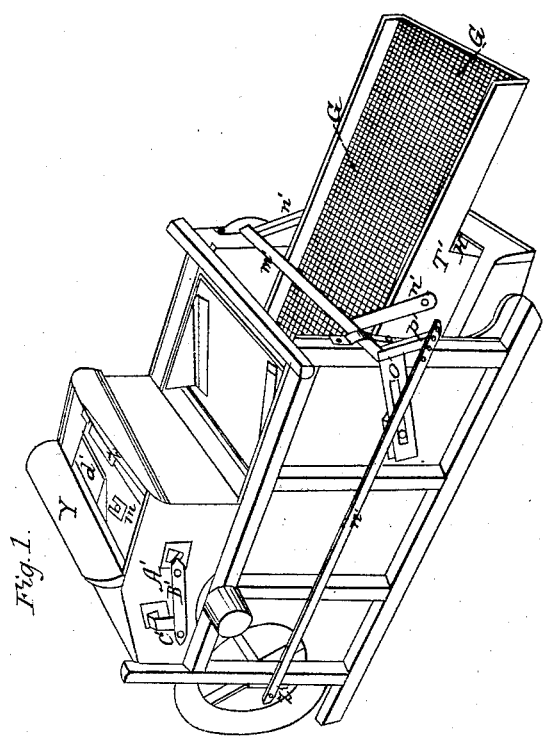

Figure 1 is a perspective view, of the machine; Fig. 2 is a perspective of a segment of the case; Fig. 3, is a perspective view of a segment of the rubber; Fig. 4, section longitudinally and vertically through the machine; Fig. 5, the rubber in the case detached; Fig. 6, a section longitudinally and horizontally through the rubber and case.

Its construction is as follows viz: The rubber R, is of a double cylindrical truncated conical form, the bases of which are toward the center and the cylindrical part at each end as seen at Figs. 5 and 6, said rubber is formed of segments see Fig. 3, twenty four forms the rubber twelve at each end. The segments are laid upon three heads *d*, Fig. 6 and banded at E. The cylindrical part of the rubber has upon it deep spiral flutes for the purpose of taking in the seed marked F, see Figs. 3, 5 and 6. The conical part is thickly covered with small spiral flutes from H, to I, see Fig. 3, from I, to K, the flutes run on a parallel with the segments, these small flutes are tapering or of wedge form from H, to K, see Figs. 3, and 6, and all the flutes are filled with teeth similar to saw teeth, there are three of the large flutes removed from every other segment which gives it greater capacity to receive the unhulled seed. The case L, see Fig. 5, is of similar construction, the cylindrical part being a little longer than the cylindrical part of the rubber it is composed of segments, see Fig. 2, and of the same number as the rubber, it is set up in two parts with a head T, see Fig. 6. At each end and connected at the center by bolts passing through ears at M, the bolts have double burs by means of which the case is set close or wide at pleasure, there is a band of sheet iron *n*, see Fig. 5, riveted on one part and passing closely over the other covering the space between the two. At each end of the case there is an opening, O, where the machine receives the unhulled seed through the hopper Y, see Figs. 1, and 4, and by the rubber conveyed to the center. This opening O, is formed by having three short segments at each end cut off at 8, see Fig. 2. There is another opening P, at the center where the seed makes its exit. This is formed by cutting off two on each end, R, see Fig. 2, and all substantially hooped or banded together as seen at S. There are two ears on each head at the ends of the case marked U, see Fig. 6, by which the case is made fast to the frame. On the inside of the cylindrical part of the case there is a single flute or rib slightly spiral on each segment which serves to hold and conduct the seed to the center of the machine. This is marked V, see Fig. 2. The conical part W, is covered with small wedged formed flutes offsetting alternately and similar to the rubber which forces the seed to change its position. By thus constructing the flutes the body of the rubber and case approximate each other more rapidly than does the point of the teeth at the center, while the space is open and free to receive at the ends, as seen at F, and H, see Fig. 6, and as the unhulled seed is rapidly taken in by the flutes F, through the opening O, see Fig. 5, and forced into the wedge formed space H, see Fig. 6, (which is narrow at the issue) in which the seed is firmly packed and rapidly forced through hulling it with the utmost facility the most of the seed being hulled by the friction of one grain upon another, thus doing away with two great objections viz, high motion, and sharp surface either of which break seed. There is a shaft *z*; passing through the hopper with flanges opposite the opening O, in the case this is made to revolve by means of a belt leading from a pulley on the fan shaft *y*, see Fig. 4, this distributes the seed in the hopper. On the other end there is a crank A', see Fig. 1 from which a connecting rod B', to an arm C', on a shaft running parallel with and back of the other, this shaft has packers attached to it directly over the openings O, in the case as the connecting rod B', acts upon the arm C', it gives an up and down with and slightly circular motion to the packers which draws and presses the unhulled seed to the rubber thus forming a most perfect feeder. Varied forms may be given to this packer some of which are described in my caveat—as the seed and chaff is discharged from the huller at T, see Fig. 5, it is thrown into a cavity E', see Fig. 4, and falls onto the shaking shoe F', where it is separated.

The shoe is constructed by placing blocks of wood or other material cut to the proper length and bevel between the sieve frames with holes through which bolts may pass. They are marked i', see Fig. 4, the bolts K', hold it firmly together—the sides are of cloth or some light material thus forming a strong light shoe; there are two sieves, G', is a coarse sieve and somewhat longer than fine sieve H', the shoe is suspended at the inner end by straps L', and at the outer end by an armed shaft M', there are two arms N', by which the shoe is suspended a balance arm O', by means of which the shoe is balanced, there is another arm P' to which the connecting rod R', see Fig. 1, is attached which connects with a crank on the fan shaft S', this rod has in it a number of holes for the purpose of adjusting the shoe; the shoe has an oscillatory movement back and forth in the machine, but its motion is all back of the center of gravity, giving it somewhat of an up and down motion which is increased by lengthening the rod, thus it is easily arranged for wet or dry seed, for wet seed I lengthen the rod which throws the chaff off more rapidly. The box into which the seed falls P', Fig. 4 is open at each end giving an opportunity for the blast to sweep the dust from the seed the fan W', is a common underblast fan, driven by a belt 9 see Fig. 4, leading from a pulley on the cylinder shaft to a pulley 10 on the fan shaft.

Having thus fully described my improvement—I do not claim the peculiar construction of the rubber and case neither the feeding in at each end and discharging at the center as these were patented by me in 1844, neither do I claim the invention of the screw or spiral flute or the wedge—but

What I do claim as new and desire to secure by Letters Patent is:

The feeding apparatus substantially as herein set forth.

A. B. CRAWFORD.

Witnesses:
　GEORGE BRAUNECK,
　WM. MCCURDY.